United States Patent [19]

Nelson

[11] 4,394,915
[45] Jul. 26, 1983

[54] HOT MELT ADHESIVE COMPOSITIONS AND BOTTLE ASSEMBLIES USING SAID COMPOSITIONS

[75] Inventor: Jeffrey Nelson, Milwaukee, Wis.

[73] Assignee: Findley Adhesives Inc., Elm Grove, Wis.

[21] Appl. No.: 367,738

[22] Filed: Apr. 12, 1982

[51] Int. Cl.$^3$ .................. B65D 23/00; C08L 53/00
[52] U.S. Cl. ............................ 215/12 R; 428/35; 525/88; 525/90; 525/91
[58] Field of Search ............... 428/35; 215/12 R, 1 C; 525/88, 90, 91

[56] References Cited

U.S. PATENT DOCUMENTS

| | | | |
|---|---|---|---|
| 3,749,630 | 7/1973 | Bayer | 215/12 R |
| 3,952,898 | 4/1976 | Bayer | 215/12 R |
| 4,212,910 | 7/1980 | Taylor et al. | 428/35 |
| 4,357,459 | 11/1982 | Runavot et al. | 525/88 |

FOREIGN PATENT DOCUMENTS 2066270 7/1981 United Kingdom ............... 525/88

*Primary Examiner*—William R. Dixon, Jr.

[57] ABSTRACT

A hot melt adhesive especially useful for producing PET bottle assemblies comprises a blend of: (1) a block copolymer selected from the class consisting of: (a) A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) an ethylene/vinyl acetate copolymer; (3) a tackifying resin which serves to extend the adhesive properties of the system; (4) a stabilizer; and (5) a wax or oil diluent. PET bottle assemblies prepared using the above adhesive compositions are more resistant to separation than those prepared with prior art compositions not containing the ethylene/vinyl acetate copolymer.

10 Claims, No Drawings

NEW HOT MELT ADHESIVE COMPOSITIONS AND BOTTLE ASSEMBLIES USING SAID COMPOSITIONS

FIELD OF THE INVENTION

The present invention relates to a bottle assembly wherein a polyethylene base cup is joined to a blow-molded polyester terephthalate (PET) bottle with a new hot melt adhesive composition. More particularly, it relates to new hot melt adhesive compositions having improved properties which make them particularly useful in assembling base cups to PET bottles.

BRIEF DESCRIPTION OF THE PRIOR ART

Polyester bottles are widely used in the soft-drink industry. These bottles are usually produced by blow-molding a bottle having a rounded bottom which requires a separate base cup in order to stand upright. The base cup also gives the bottle sufficient integrity to withstand bottling, handling and storage conditions. The base cup is normally made of a high density polyethylene (HDPE) and is joined to the bottle with a hot melt adhesive.

The forces to which the bottle assemblies are subjected to in bottling, handling and storage put the adhesive bond holding the base cup to the bottle under substantial stresses which can cause the base cup and bottle assemblies to be split or separated. Such stresses prior to filling may cause the empty bottles to split so that they cannot be used on automated filling lines. Once the bottle is filled, the pressure exerted by the contents is sufficient to provide a better mechanical fit between the base cup and bottle, thus keeping the base cup joined to the bottle. However, once the bottle is partially emptied the improved mechanical fit no longer exists and the adhesive must prevent the separation of bottle and base cup. The adhesive bond also must resist the stresses caused by variety of temperature and humidity conditions to which the bottle assemblies are subjected before and after filling.

The soft drink bottling industry has developed a set of specifications which the bottle assemblies must meet. For example, the bottle assemblies must not separate when they are chilled to 0° F. and dropped (empty) a distance of 6 feet and chilled to 40° F. and dropped (full) a distance of 6 feet.

In the Taylor et al U.S. Pat. No. 4,212,910, bottle assemblies are described and claimed in which the adhesive composition is a blend of a styrene-butadiene-styrene or a styrene-isoprene-styrene block copolymer, a tackifying resin, a stabilizer and a wax or oil diluent. The patented compositions are improvements over the previously employed adhesives but are not without disacvantages. For example, the bond strength of the adhesive compositions at room temperature is less than desired and the high temperature stability of the compositions could be improved.

SUMMARY OF THE INVENTION

It is a general object of the present invention to provide adhesive compositions which can be used to produce a PET bottle assembly in which the adhesive bond between the PET bottle and base cup will withstand all the normal stresses to which the assembly may be exposed.

It is a further object to disclosed adhesive compositions which when employed in PET bottle assemblies produce adhesive bonds that meet the specifications demanded by the bottling industry.

The adhesive compositions of the present invention are a blend of: (1) a block copolymer selected from the class consisting of: (a) an A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) an ethylene/vinyl acetate copolymer; (3) at least one tackifying resin which serves to extend the adhesive properties of the system; (4) at least one stabilizer; and (5) at least one wax or oil diluent.

The adhesive compositions of the present invention differ significantly from those of the Taylor et al U.S. Pat. No. 4,212,910 in that they also contain an ethylene/vinyl acetate copolymer as an essential ingredient.

I have discovered that the addition of an ethylene/vinyl acetate copolymer to the adhesive compositions of the Taylor et al patent provides an adhesive composition which has all the advantages of the Taylor et al compositions plus lower cost, improved bond strength, even at room temperature, and improved high temperature stability. The discovery that the addition of an ethylene/vinyl acetate copolymer could provide these advantages is surprising because the Taylor et al patent discloses that the use of prior art ethylene/vinyl acetate copolymer (EVA) based hot melt adhesives resulted in PET bottle assemblies that failed to meet the bottling industry specifications (Column 1, lines 52 to 56 and Column 6, lines 6 to 32). The Taylor et al patent disclosure clearly does not suggest to one skilled in the art that the addition of an ethylene/vinyl acetate copolymer to the Taylor et al adhesive compositions would result in any improvement in those compositions.

The bottle assemblies made with the adhesive compositions of the present invention have bonds which possess an unusual combination of excellent low, normal and high temperature adhesion and flexibility as well as high bond strengths.

DESCRIPTION OF THE PREFERRED EMBODIMENT

The block polymer component (1) of the hot melt adhesive of the present invention may be one of two specific classes:

(a) An unvulcanized elastomeric block polymer wherein the respective monomeric moieties are arranged in an alternating sequence having the general configuration A-B-A. Wherein A is a non-elastomeric block derived from the moieties of a monovinyl aromatic hydrocarbon monomer and B is an elastomeric polymer block derived from the moieties of either a conjugated diene monomer or a mono-olefin, the total concentration of the A block therein ranging from about 10 to 50% as based on the total weight of the polymer. It should be noted that, in these polymers, styrene is ordinarily used as the monovinyl aromatic hydrocarbon member. Butadiene-1,3 and isoprene are the most frequently used conjugated diene members. Thus, for example, styrene-butadiene-styrene polymers are commercially available from Shell Chemical Co. under the trademarks "Kraton 1101" and "Kraton 1102" while styrene-isoprene-styrene polymers are available under the trademarks "Kraton 1107" and "Kraton 84-0554." The mono-olefin is generally a ethylenebutylene monomer, although other monomeric components could be used. Suitable styrene-ethylenebutylene-styrene copolymers for use herein are available commercially from Shell Chemical Co. under the tradename "Kraton G". The preferred block copolymer for use in the compositions of the present invention is Kraton 1102.

(b) A teleblock copolymer comprising molecules having at least three branches radially branching out from a central hub, each said branch having polystyrene terminal blocks and a butadiene segment in the center. This type of block copolymer may also be described as having a branched polymerized butadiene mid-block with a polystyrene terminal block at the end of each branch. The number of butadiene units should, in all cases, be greater than the number of styrene units. Typical teleblock copolymers are available commercially from Phillips Petroleum Company under the SOLPRENE trademark.

It will also be recognized that mixtures of any of the above block copolymers may also be used as base components in the adhesives employed in the PET bottle assemblies of the present invention.

The ethylene/vinyl acetate component (2) of the hot melt adhesive of the present invention is well known in the art, especially as a resin for blending in hot-melt coatings and adhesives.

Several manufacturers produce these copolymers. The Plastic Products and Resins Department of the DuPont Company produces a large number of composition and viscosity combinations under their general trademark "Elvax®." The Elvax resins are sold in "grade" groupings based on vinyl acetate content: for example, 200-series resins contain about 28 percent vinyl acetate; 300-series, 25 percent; and 400-series, 18 percent. Within each series the inherent viscosity rises with increasing grade number, from 0.54 with Elvax 210, to 0.94 with Elvax 260, and 1.01 with Elvax 265. Among these resins Elvax 210, which has a melt index of 400, has proved particularly effective in compositions of the present invention. All grades of Elvax are stabilized against viscosity variation in use by addition of 50–1000 ppm of butylated hydroxytoluene.

The tackifying resin component (3) which are used in the hot melt adhesive of the present invention appear to extend the adhesive properties of the block polymer. As used herein, the term "tackifying resin" includes: (a) natural and modified rosins such, for example, as gum rosin, wood rosin, tall-oil rosin, distilled rosin, hydrogenated rosin, dimerized rosin, and polymerized rosin; (b) glycerol and pentaerythritol esters of natural and modified rosins, such, for example, as in the glycerol ester of pale wood rosin, the glycerol ester of hydrogenated rosin, the glycerol ester of polymerized rosin, the pentaerythritol ester of hydrogenated rosin, and the phenolic modified pentaerythritol ester of rosin; (c) polyterpene resins having a softening point, as determined by ASTM method E28 58T, of from about 60° to 140° C., the latter polyterpene resins generally resulting from the polymerization of terpene hydrocarbons, such as the bicyclic mono-terpene known as pinene, in the presence of Friedel-Crafts catalysts at moderately low temperatures; (d) phenolic-modified terpene resins such, for example, as the resin product resulting from the condensation in an acidic medium, of a bicyclic terpene and a phenol; and (e) aliphatic petroleum hydrocarbon resins having a Ball and Ring softening point of from about 60° to 140° C., the latter resins resulting from the polymerization of monomers consisting primarily of olefins and diolefins. Especially preferred is a polymerized tall oil rosin available under the name SYLVATAC 95 from Sylvachem Corporation of Jacksonville, Florida.

The stabilizers (4) which are used in the hot melt adhesive composition of the present invention help to protect the otherwise vulnerable block polymer, and thereby the total adhesive system, from the thermal and oxidative degradation which is frequently encountered during the manufacture and application of the adhesive as well as in the orginary exposure of the final adhered product. The ethylene/vinyl acetate copolymer also appears to help protect the block polymer from thermal and oxidation degradation. Such degradation is usually manifested by deterioration in appearance, physical properties and performance. Among the applicable stabilizers are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include: 1,3,5-trimethyl-2,4,6-tris(3,5-ditert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)propionate; 4,4'-methylenebis(2,6-di-tert-butyl phenol); 2,2'-methylenebis(4-methyl-6-tert-butylphenol); 4,4'-thiobis(6-tert-butyl-o-cresol); 2,6-di-tert-butylphenol; 6-(4-hydroxyphenoxy)-2,4-bis(n-octylthio)-1,3,5-triazine; 2,4,6-tris(4-hydroxy-3,5-di-tert-butyl-phenoxy)-1,3,5-triazine; di-n-octadecyl-3,5-di-tert-butyl-4-hydroxybenzylphosphonate; 2-(n-octylthio)ethyl-3,5-di-tert-butyl-4-hydroxy-benzoate; and sorbitol hexa-[3-(3,5-di-tert-butyl-4-hydroxy-phenyl)propionate]. Especially preferred as a stabilizer is tris (monophenyl phosphate) which is available under the trade name TNPP from Weston.

The performance of these stabilizers may be further enhanced by utilizing, in conjunction therewith: (1) synergists such, for example, as thiodipropionate esters and phosphites; and (2) chelating agents and metal deactivators such, for example, as ethylenediamine tetraacetic acid, salts thereof, and disalicylalpropylenediimine.

The wax or oil diluents (5) which are used in the present invention reduce the melt viscosity or cohesive characteristics of the hot melt adhesive compositions without appreciable decreasing their adhesive binding characteristics. Among the applicable wax diluents are included: (1) low molecular weight, e.g. 1000–6000, polyethylene having a hardness value, as determined by ASTM method D-1321, of from about 0.1 to 120 and an ASTM softening point of from about 150°–250° F.; (2) petroleum waxes such as paraffin wax having a melting point of from about 130° to 175° F. and microcrystalline wax having a melting point of from about 135° to 200° F., the latter melting points being determined by ASTM method D127-60; (3) atactic polypropylene having a Ball and Ring softening point of from about 120° to 160° C.; and (4) synthetic waxes made by polymerizing carbon monoxide and hydrogen such as Fischer-Tropsch wax. Each of these wax diluents is solid at room temperatures. Hydrogenated animal, fish and vegetable fats and oils such as hydrogenated tallow, lard, soya oil, cottonseed oil, castor oil, menhadin oil, cod liver oil, etc., are solid materials at ambient temperature by virtue of their being hydrogenated and are also found to be useful to function as the wax diluent equivalent. These hydrogenated materials are often referred to in the adhesive industry as "animal or vegetable waxes." Additionally, hydrocarbon oils, especially naphthenic or paraffinic process oils, may also be employed herein as the diluent. Especially preferred is the use of a combination of paraffin wax having a melting point of 150° C. and white mineral oil U.S.P.

The novel hot melt adhesive compositions of the present invention typically contain a concentration of the block polymer ranging from about 20 to 40%, a concentration of ethylene/vinyl acetate copolymer ranging from about 5 to 20%, a concentration of tackifying resin ranging from about 30 to 60%, a concentration of a stabilizer ranging from 0.1 to 4% and a concentration of a wax or oil ranging from about 10 to 30%, said concentrations being based on a 100% solids total weight of the hot melt adhesive composition.

The hot melt adhesive compositions may be formulated using any of the techniques known in the art. An exemplary procedure involves placing approximately half of the total tackifying resin, all the wax and oil and the stabilizer in a jacketed mixing kettle, preferably in a jacketed heavy duty mixer of The Baker-Perkins or Day type, which is equipped with rotors and thereupon raising the temperature to a range of from about 250° to 350° F., preferably 300° F. The precise temperature to be used will depend on the melting point of the particular ingredients. When the initial mixture has been melted and blended, the mixture is blanketed in $CO_2$ at a slow flow rate and the block polymer is added. When the block polymer is dissolved the ethylene/vinyl acetate copolymer is added and the mixture blended until smooth. The remainder of the tackifying resin is then added and mixing continued until well blended.

The viscosity of the hot melt adhesive composition at 325° F. is preferably about 4000 cps.

Optional additives may be incorporated into the hot melt compositions in order to modify certain properties thereof. Among these additives may be included: colorants such as titanium dioxide, and fillers such as talc and clay, etc.

The PET bottle assemblies of the present invention are normally produced by feeding the bottles and base cups onto straight-line or centrifugal feeder units, the hot melt adhesive applied in dots through a multiple orifice nozzle at a coating weight of approximately 0.4 to 0.75 gms. per base cup, and then the bottle and base cup are clamped together for a minimum of about 6.5 seconds to assure straight assembly and proper set-up of the hot melt adhesive. The assemblies are then generally labeled and packaged into palletized loads for shipment to the bottling operation.

The following examples will further illustrate the practice of the invention.

EXAMPLE I

A heavy duty kettle mixer which had been heated to 300° F. (149° C.) and which was equipped with a stirring paddle was charged with 824 pounds of a paraffin wax, melting point 150° C., 549 pounds of white mineral oil U.S.P., 8 pounds of tris monophenol phosphate (Weston TNPP) and 1077 pounds of polymerized tall oil rosin (Sylvatac 95). The mixture was melted, blended and blanketed under a slow flow of $CO_2$ before adding 1373 pounds of a block polymer commercially available from Shell Chemical Co. under the trademark "Kraton 1102". When the block polymer was dissolved 549 pounds of ethylene/vinyl acetate (ELVAX 210), having a melt index of 400, was added with stirring. When the mixture was smooth 1120 pounds of polymerized tall oil rosin (Sylvatac 95) was added. Mixing was continued until a homogenous well blended mass was obtained when agitation was slowed. The molten mixture was poured into a container divided into compartments and allowed to solidify.

The product thus obtained had a melt viscosity of about 4000 cps. at 325° F. as determined by a Brookfield RVT equipped with a Brookfield Thermosel (Spindle #27, 20 rpm).

EXAMPLE II

The hot melt adhesive composition of Example I was used to produce PET bottle assemblies using conventional manufacturing equipment. The bottle assemblies were subjected to a variety of testing procedures specified by the bottling industry and found to meet or exceed those specifications.

For comparative purposes, similar tests were conducted using compositions of the present invention and adhesive compositions which were identical except that they did not contain the ethylene/vinyl acetate. The compositions of the present invention were found to provide a better bond in PET bottle assemblies than the non-EVA containing compositions.

It will be apparent to those skilled in the art that the foregoing examples have been for the purpose of illustration and that variations may be made in proportions, procedures and materials without departing from the scope of the present invention. Therefore, it is intended that my invention not be limited except by the claims which follow:

I claim:
1. A hot melt adhesive which comprises a blend of: (1) a block copolymer selected from the class consisting of: (a) an A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) an ethylene/vinyl acetate copolymer; (3) a tackifying resin which serves to extend the adhesive properties of the system; (4) a stabilizer; and (5) a wax or oil diluent.

2. The adhesive composition of claim 1 wherein the block copolymer is a styrene-butadiene-styrene block copolymer.

3. The adhesive composition of claim 1 wherein the wax diluent is selected from the group consisting of low molecular weight polyethylene having a hardness value of 0.1 to 120 and an ASTM softening point of 150°–250° F., petroleum waxes having a melting point of 130°–175° F., microcrystalline wax having a melting point of 135°–200° F., atactic polypropylene having a Ball and Ring softening point of 120°–160° C., synthetic waxes made by polymerizing carbon monoxide and hydrogen and hydrogenated animal, fish and vegetable fats and oils.

4. The adhesive composition of claim 1 wherein the oil diluent is a mineral oil.

5. The adhesive composition of claim 1 wherein the block copolymer is a styrene-isoprene-styrene block copolymer.

6. The adhesive composition of claim 1 wherein the tackifying resin is selected from the group consisting of natural and modified rosin, glycerol and pentaerythritol esters of natural and modified rosin, polyterpene resins having a softening point of 60° to 140° C., phenolic-modified terpene resins, and aliphatic petroleum hydrocarbon resins having a Ball and Ring softening point of 60°–140° C.

7. The adhesive composition of claim 1 wherein the stabilizer is a high molecular weight hindered phenol or a multifunctional phenol.

8. The adhesive composition of claim 1 wherein the hot melt adhesive contains a concentration of the block polymer ranging from about 20 to 40%, a concentration of ethylene/vinyl acetate of from about 5 to 20%, a concentration of tackifying resin ranging from about 30 to 60%, a concentration of stabilizer ranging from about 0.1 to 4% and a concentration of wax or oil diluent ranging from about 10 to 30%, said concentrations being based on a 100% solids total weight of the hot melt composition.

9. A PET bottle assembly comprising a PET bottle which has been blow-molded and joined to a HDPE base cup with a hot melt adhesive which comprises a blend of: (1) a block copolymer selected from the class consisting of: (a) an A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) an ethylene/vinyl acetate copolymer; (3) a tackifying resin which serves to extend the adhesive properties of the system; (4) a stabilizer; and (5) a wax or oil diluent.

10. The PET bottle assembly of claim 9 wherein the block copolymer is a styrene-butadiene-styrene block copolymer and the ethylene/vinyl acetate copolymer has a melt index of about 400 and contains about 28% vinyl acetate.

* * * * *